United States Patent
Crump

(10) Patent No.: US 7,747,758 B2
(45) Date of Patent: Jun. 29, 2010

(54) DYNAMIC PORT ASSIGNMENT

(75) Inventor: Michael William Crump, Palm Springs, CA (US)

(73) Assignee: International Business Machines Corporation, Armonk, NY (US)

( * ) Notice: Subject to any disclaimer, the term of this patent is extended or adjusted under 35 U.S.C. 154(b) by 2424 days.

(21) Appl. No.: 10/282,541

(22) Filed: Oct. 29, 2002

(65) Prior Publication Data

US 2003/0093558 A1    May 15, 2003

Related U.S. Application Data

(60) Provisional application No. 60/350,484, filed on Oct. 29, 2001.

(51) Int. Cl.
G06F 15/16 (2006.01)
G06F 15/173 (2006.01)
G06F 15/177 (2006.01)

(52) U.S. Cl. .............. 709/228; 709/226; 709/222; 709/220

(58) Field of Classification Search ......... 709/224–229; 710/8–19
See application file for complete search history.

(56) References Cited

U.S. PATENT DOCUMENTS

| | | | |
|---|---|---|---|
| 5,838,904 A | 11/1998 | Rostoker et al. | |
| 5,918,019 A | 6/1999 | Valencia | |
| 6,003,084 A | 12/1999 | Green et al. | |
| 6,044,402 A | 3/2000 | Jacobson et al. | |
| 6,092,196 A | 7/2000 | Reiche | |
| 6,131,120 A | 10/2000 | Reid | |
| 6,134,591 A | 10/2000 | Nickles | |
| 6,170,014 B1 | 1/2001 | Darago et al. | |
| 6,182,139 B1 * | 1/2001 | Brendel | 709/226 |
| 6,195,366 B1 | 2/2001 | Kayashima et al. | |
| 6,195,691 B1 | 2/2001 | Brown | |
| 6,308,213 B1 | 10/2001 | Valencia | |
| 6,308,273 B1 * | 10/2001 | Goertzel et al. | 726/9 |
| 6,418,466 B1 * | 7/2002 | Bertram et al. | 709/221 |
| 6,457,061 B1 * | 9/2002 | Bal et al. | 709/245 |
| 6,512,754 B2 * | 1/2003 | Feder et al. | 370/338 |
| 6,581,107 B1 * | 6/2003 | Deac | 709/245 |
| 6,691,165 B1 * | 2/2004 | Bruck et al. | 709/227 |
| 6,810,420 B1 * | 10/2004 | Buse et al. | 709/224 |
| 6,941,371 B2 * | 9/2005 | Hartmann et al. | 709/227 |

* cited by examiner

*Primary Examiner*—Thu Nguyen
*Assistant Examiner*—Angela Widhalm
(74) *Attorney, Agent, or Firm*—Gates & Cooper LLP

(57) ABSTRACT

A method, apparatus, and article of manufacture provide the ability to determine a port number for a network connection. An Internet Protocol (IP) address of a server is determined. Based on the IP address, a first number is determined. An interval value is added to the first number resulting in a second number to be used as a port number. The interval value is repeatedly added to the second number if the second number is not available for use as the port number.

33 Claims, 5 Drawing Sheets

DYNAMIC PORT ASSIGNMENT

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 60/350,484, filed Oct. 29, 2001, by Michael William Crump, entitled "Advanced Client/Server Functionality,".

BACKGROUND OF THE INVENTION

1. Field of the Invention

The present invention relates generally to a computer network connection, and in particular, to a method, apparatus, and article of manufacture for dynamically determining a port number for use in a network connection.

2. Description of the Related Art

Computer use has proliferated and continues to expand as technological capabilities rapidly increase. Such technological capabilities include the ability for two or more computers on a network (e.g., the Internet or a local area network (LAN)) to communicate with each other. As part of the prior art communication process, the client and server must have some pre-existing knowledge (e.g., obtained from a third party) regarding information necessary to allow and support communication (e.g., an Internet Protocol (IP) address and port number). The need for such preexisting knowledge provides significant limitations and/or impossibilities in the ability to produce a product that connects computers automatically without the need for human intervention. To better understand these limitations, a description of the prior art methods for network communication is useful.

The industry standard mechanism for connecting two computers across a network connection is to use TCP/IP (transmission Control Protocol/Internet Protocol), a set of rules by which the software, on either side of the computer connection, conducts a conversation and sends and receives data. The side that initiates the connection is referred to as the client; the side that responds to the initiation is referred to as the server. The initiation process by the client relies on two basic TCP/IP rules: (1) the client must identify the other machine by name or address; and (2) the client must specify a number between 1 and 65,535.

It is that second requirement that is the source of the difficulty in the prior art. The number in question is called a "Port Number", and there can be over sixty five thousand different port numbers on just one computer. The client must specify the right port number; otherwise the attempt to connect will fail. The issue that arises is how the client knows the correct port number. In the prior art, the client should/must know the number ahead of time, or should not attempt to connect.

This seemingly unworkable situation is commonplace and widely accepted as the basic operation of a TCP/IP client/server connection. FIG. 1 is a flow chart illustrating the prior art process for configuring a TCP/IP connection. At step 100, a person begins to install and configure the server software. During the configuration process, some arbitrary number is chosen by that person at step 102 and used thereafter by the server at step 104.

Once the server is configured through steps 100-104, the client may communicate with the server. To communicate with the server, the client learns the arbitrary number at step 106. Anyone attempting to connect to the server would have learned of the number by (a) receiving a memo or email; (b) reading a centrally located document; or (c) asking a friend, co-worker, or person responsible for the server. Such requirements would make it nearly impossible to produce client/server products that connect automatically without need for human intervention. Once the client learns of the number at step 106, the number can be used to connect and communicate with the server at step 108.

Accordingly, in the prior art, to support communication with a server, the client must be informed of a port number of the server. Once the port number is obtained, the client is configured to communicate with the server through the port number. Thus, the prior art is hindered by the inconvenience and disadvantage of human intervention whenever network communication is desired.

SUMMARY OF THE INVENTION

The prior art maintains a requirement that an end-user specify a number between 1 and 65,535 as a port number for use in a network connection between a client and server. In this regard, the prior art requires an end user know what the number might be, and care about what number is actually used. The present invention eliminates these requirements.

When a connection is initiated between a client and server, the port number is calculated without intervention from an end user. The IP address of a server is parsed to obtain a base first number. For example, the left-most digit from each stanza of the IP address may comprise the base first number. A predetermined interval value is then added to the base first number resulting in a second number that may be used as the port number. If the port number is unavailable, the interval value is added again to the second number.

In addition to dynamically determining the port number as described above, embodiments of the invention may verify the identify of the server (i.e., that connection with the appropriate server application has been established) using a low tolerance signature. With a low tolerance signature, the server transmits a signature to the client immediately upon establishing a connection. The server's signature is then compared against a list of valid signatures. Once validated, the client is ensured that a connection with the appropriate server has been established.

Further, the server may authenticate the client using the Hostname of the client. Once the host name of the client has been obtained, the Client ID and Client Domain of the host name is compared, and validated/authenticated against a list of acceptable Client Ids and Client Domains.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention solve the difficulty of getting two computers to connect to each other. To determine the port number for use in a network communication, the IP address of a server is parsed to obtain a base first number. An interval value is then added to the base first number to obtain a second number that is used as the port number. Additionally, both the client and server may validate/authenticate each other through a variety of mechanisms.

General Hardware and Software Environment

Figure 1:
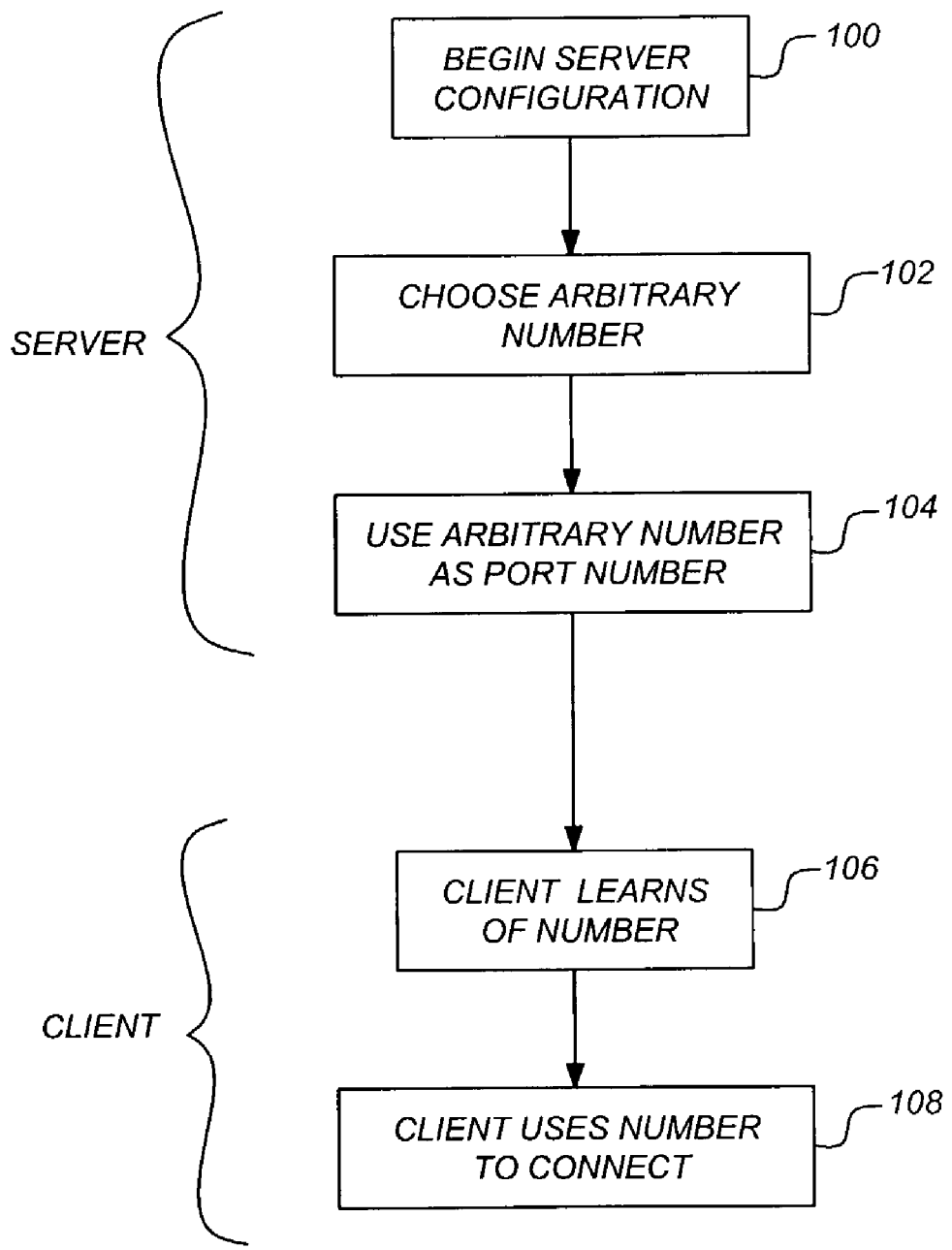
FIG. 1 is a flow-chart illustrating the prior art process for configuring a TCP/IP connection.
Figure 2:
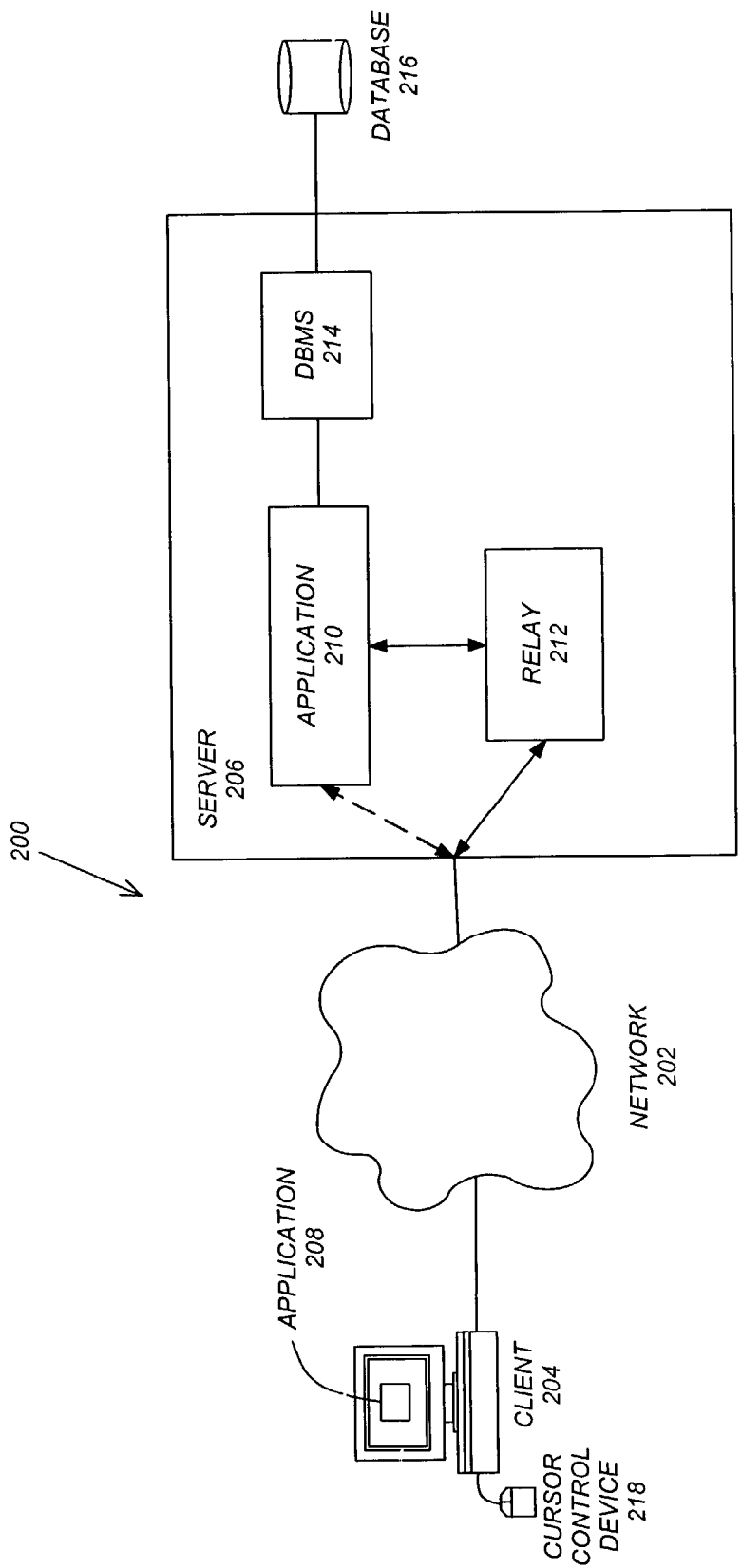
FIG. 2 schematically illustrates a hardware and software environment in accordance with one or more embodiments of the invention.

FIG. 2 schematically illustrates a hardware and software environment in accordance with one or more embodiments of the invention, and more particularly, illustrates a typical distributed computer system 200 using a network 202 to connect client computers 204 to server computers 206. A typical combination of resources may include a network 202 comprising the Internet, LANs, WANs, SNA networks, or the like, clients 204 that are personal computers or workstations, and servers 106 that are personal computers, workstations, minicomputers, or mainframes. Additionally, both client 204 and server 206 may receive input (e.g., cursor location input) and display a cursor in response to an input device such as cursor control device 218.

A network 202 such as the Internet connects clients 204 to server computers 206. Clients 204 may execute a client application 208 (e.g., a web browser) under an operating system such as Windows™, UNIX™, OS/390™ (or multiple virtual storage (MVS)), and/or LINUX™. The client 204 communicates with server computers 206 executing a server application 210 (e.g., a Web server) under an operating system such as Windows™, UNIX™, LINUX™, and/or under certain circumstances OS/390™.

In one or more embodiments of the invention, the client application 208 and server application 210 may be part of a suite of software such as CIRCUIT™ (Centralized Installation, Replication, and Configuration Using Internet Technology) available from Candle Corporation.

Such a software suite may provide many features. For example, between the client 204 and the server 206, the software suite may inquire upon, retrieve, and install software that resides on the server 206, after having first been downloaded from a web site (e.g., on another server 206). Accordingly, the server 206 may act as a software repository for various products and maintenance, and the clients 204 permit the end-user to retrieve their desired software from the platform of choice.

The software suite may also use an extra component 212 in addition to other components (i.e., in addition to client application 208 or server application 210). This extra component 212 may download the software from a web site and may be referred to as the Relay 212 since it may act as the interface between a customer's multi-platform environment (e.g., network 202 and multiple clients 204) and a web environment (e.g., server application 210 and any web support that may be available on a server 206). The component 212 may reside on the same machine (referred to as "the download box") as the server 206.

The Relay 212 may operate in bi-directional mode, performing both downloads into the software suite (e.g., into server 206 or client 204 from a web site), and uploads into a web environment. However, one or more embodiments may only offer download capability.

The Relay 212 may also use HTTP (Hypertext Transfer Protocol) for communication with a web site. Clients 204 and servers 206 may use TCP/IP connectivity for all data interchange. SNA (systems network architecture) may (or may not) be supported for various reasons. Some or all data transfers between client 204 and server 206 may be accomplished using TCP/IP Sockets and an appropriate exchange protocol. Further, such a configuration may eliminate the need for File Transfer Protocol (FTP).

In addition to the use of Relay 212 on server 206, an application on server 210 may manipulate data in database 216 through a database management system DBMS 214. For example, the software repository may be stored in database 216. Alternatively, database 216 may be part of or connected directly to client 204 instead of communicating/obtaining the information from database 216 across network 202.

Generally, these components 208-218 all comprise logic and/or data that is embodied in or retrievable from a device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Detailed Software Embodiments

One or more embodiments of the invention may eliminate the need for having the end-user specify a TCP/IP port number (e.g., between 1 and 65,535) in order to connect. Furthermore, the need for having to know what the number might be, or caring about what number is actually used may be eliminated.

The invention provides a mechanism/method for a client 204 and 206 to connect to one another. As a part of that connection operation, Dynamic Port Assignment is used between the client 204 and the server 206. One or more objectives behind this feature may include (1) the simplification of server 206 configuration; (2) the avoidance of conflict with other socket applications on the same host; and (3) the increase in difficulty for a non-authorized client 204 to find and/or connect to the server 206.

One or more embodiments of the invention provide the ability to specify PORT=AUTO on both server 206 (e.g., in server application 210) and clients 204 (e.g., in client application 208), in addition to being able to specify PORT=nnnnn (a number between 1 and 65535). By default, all server applications 210 and client applications 204 may be configured as PORT=AUTO.

Server Initialization Sequence

During server 206 initialization, if PORT=AUTO is specified, the server 206 derives a 4-digit number from its own IP address. Specifically, server 206 may use the left-most digit from each stanza of the IP address. For example, if the IP address is 10.20.30.40, then the 4-digit number will be 1234. If the IP address is 42.1.255.33, then the 4-digit number will be 4123. If 5-stanza IP addresses are introduced, the fifth right-most stanza is ignored. Alternatively, any number that is determined by or based on the server's 206 IP address may be utilized.

The server 206 retrieves a pre-defined interval value to use in the construction of the port number. The interval value may be retrieved from memory or received from an outside source (e.g., another server 206, client 204, or other computer). The interval value is a number that is combined with the number derived from the IP address to determine a port number. For example, the interval value may be 10,000.

A dynamic port number is then obtained by adding the derived number (e.g. 1234) to the interval value (10,000)–11234 in this example. If the port identified by the dynamic port number is unavailable, the addition of the interval value is repeated (e.g., 11234+10000 giving 21234). Thereafter, the server 206 attempts to obtain the port identified by the new dynamic port number. The server 206 may make "n" attempts to obtain a successful port number before issuing a message and terminating. For example, if the number "n" is 5, the server 206 may attempt to obtain ports 11234, 21234, 31234, 41234 and 51234 before terminating unsuccessfully.

Table 1 illustrates sample server 206 initialization logic in accordance with one or more embodiments of the invention.

TABLE 1

SAMPLE SERVER INITIALIZATION LOGIC

{INIT:
Call Socket(GetHostID) to retrieve the local IP Address.
Parse IP Address into N1 '.' N2 '.' N3 '.' N4.
Port = LeftJustify(N1,1) || LeftJustify(N2,1) || LeftJustify(N3,1) || LeftJustify(N4)
Increment = 10,000
Loop    5 times,
        {
        Bind Socket (Port Number + (LoopCount * Increment))
        IF rc=0 THEN LEAVE
        }
}INIT:END In Table 1, the increment value and loop counter are 5 and 10000 respectively. However, it should be noted that the increment value and loop counter may be any number, but whatever values are used, a maximum value may be required (e.g., 65535).

Figure 3:
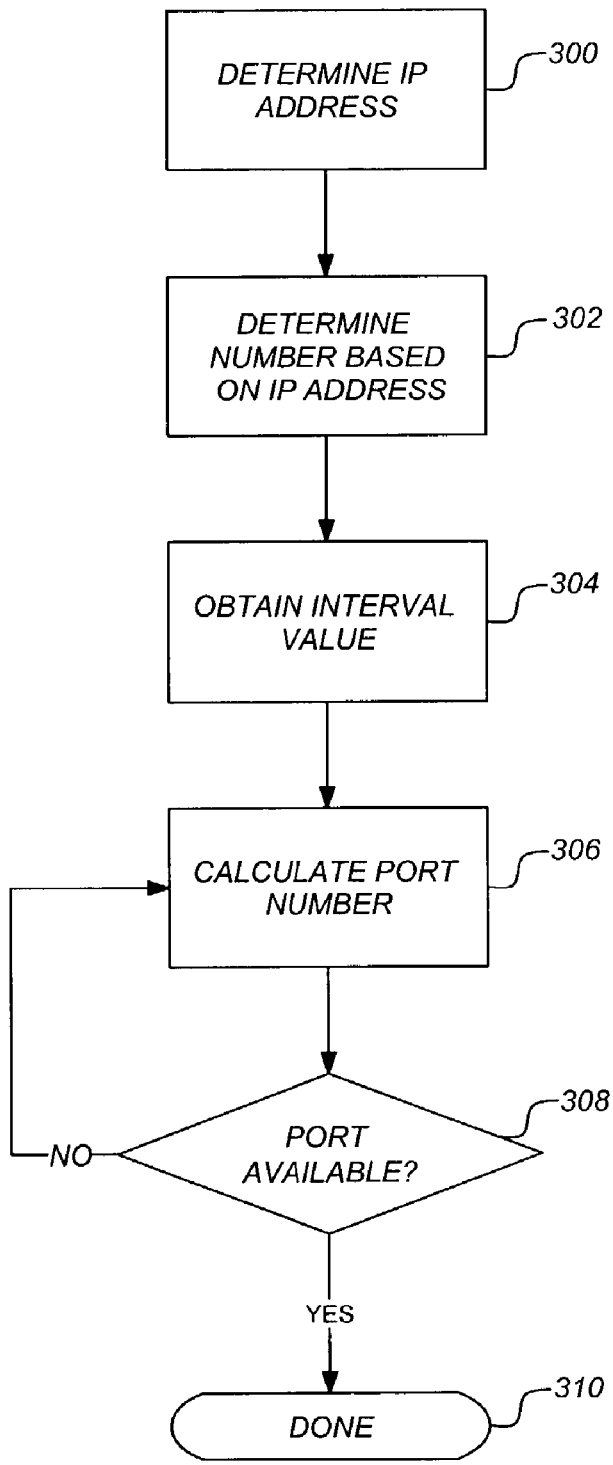
FIG. 3 is a flow chart illustrating the initialization logic for determining a port number in accordance with one or more embodiments of the invention.

FIG. 3 is a flow-chart illustrating the initialization logic for determining a port number in accordance with one or more embodiments of the invention. At step 300, the IP address of the server 206 is determined. In Table 1, the IP address is determined by calling a socket application to retrieve the local IP address.

At step 302, a first number is determined that is based on the IP address. In Table 2, the first number is determined by taking the leftmost number from each stanza of the IP address. At step 304, the interval value is obtained. The interval value may be obtained by a variety of means. For example, the interval value may be predetermined or may input or transmitted at the time of a communication. At step 306, the dynamic port number is determined based on the first number and interval value.

At step 308, a determination is made regarding whether the port at the calculated dynamic port number is available. In Table 1, such a determination attempts to bind the socket to the dynamic port number (i.e., the port number is held for the particular server 206 program). If the bind operation is not successful (e.g., the return code rc≠0), a new dynamic port number may be calculated at step 306. Steps 306 and 308 may be repeated a predetermined number of times. For example, the interval value may be added to the first number until a maximum dynamic port number value has been reached. Alternatively, the calculations and attempted bind operation may repeat a specified number of times (e.g., the bind operation of Table 1 repeats five (5) times). If the loop is terminated without success, an error may be returned indicating that a port number could not be determined.

If a port is available (e.g., if the bind operation is successful (e.g., rc=0)), the process is complete at step 310 and the server 206/server application 210 may utilize the socket connection with the determined port number.

Client Initialization Sequence

The process illustrated in FIG. 3 is also followed when a client 204 is initialized for communication with a server 206. During client 204 initialization at step 300, the IP address of the server 206 is determined. If a Hostname (i.e., a logical name assigned to a computer) is being used, then the client 204 must request TCP/IP to return the IP address associated with the Hostname. Therefore, if the client 204 lies outside the DHCP (dynamic host control protocol) network 202 where the server 206 resides, then direct IP addressing must be used. However, in one or more embodiments, all clients 204 and servers 206 may be required to be identifiable by Hostname, and therefore must all reside within the same DHCP network 202. With such a requirement, connectivity initiated using only an IP address may not be supported.

Once the IP address has been obtained, the client 204 utilizes the same method as the server 206 to determine the port number (i.e., employing the same interval value and loop counter as illustrated in steps 302-308). In this regard, if PORT=AUTO is specified, the client 204 derives a 4-digit number from the server's 206 IP address.

Table 2 illustrates sample client 204 initialization logic in accordance with one or more embodiments of the invention.

TABLE 2

SAMPLE CLIENT INITIALIZATION LOGIC

{INIT:
Call Socket(GetHostByName) to retrieve the partner IP Address.
Parse IP Address into N1 '.' N2 '.' N3 '.' N4.
Port = LeftJustify(N1,1) || LeftJustify(N2,1) || LeftJustify(N3,1) || LeftJustify(N4)
Increment = 10,000
Loop 5 times,
        {
        Connect Socket (Port Number + (LoopCount * Increment))
        IF rc=0 THEN LEAVE
        }
}INIT:END As illustrated in Table 2, at step 302, the first number is determined based on the IP address by parsing the IP address into N1, N2, N3, and N4 with each N value being the leftmost digit of each stanza of the IP address. The interval value (i.e., Increment) is set at 10,000 at step 304. Thereafter, steps 306-308 are repeated five (5) times while attempting to connect to the socket having the calculated port number. When the return code indicates the connect operation is successful, an available port number has been found and the socket is then utilized to communicate with the server 206.

Signature Identification

The preceding use of a dynamic port number has one obvious flaw, and that is the case of mistaken identity. If a server 206 fails on its first attempt to obtain the first port number, then chances are extremely high that it is currently in use by an active TCP/IP Socket server application 210. The server 206 will then go on to obtain the next highest port number (e.g., 21234 in the example described above). Given that the server 206 is now waiting for inbound requests on port number 21234, the unfortunate part is that all incoming clients 204 will attempt to communicate with port number 11234 first. Given that Port 11234 is a valid server application 210 (i.e. not the correct server application 210), the connection request from the client 204 would probably succeed. However, subsequent actions that may occur are categorized as "unpredictable results." Typically, the client 204, server 206, or both would get permanently locked as they confuse each other with their requests to change data flow direction.

Accordingly, a mechanism is needed that identifies the appropriate server application 210 as actually being the appropriate server application 210. One or more embodiments of the invention provide this mechanism by using what is referred to as a "low tolerance signature". When a client 204 connects with a server 206, the client 204 then immediately expects back a signature that matches with the client's 204 copy of the signature. If no response is received within a short period of time, or if a mismatching response is received, the connection is instantly dropped by the client 204. The client 204 would then proceed with the next higher port number identified in steps 306-310 (or identified in a list). Additionally, the server 206 may only send a signature to a client 204 after the client 204 has been validated through security (see client authentication below).

Figure 4:
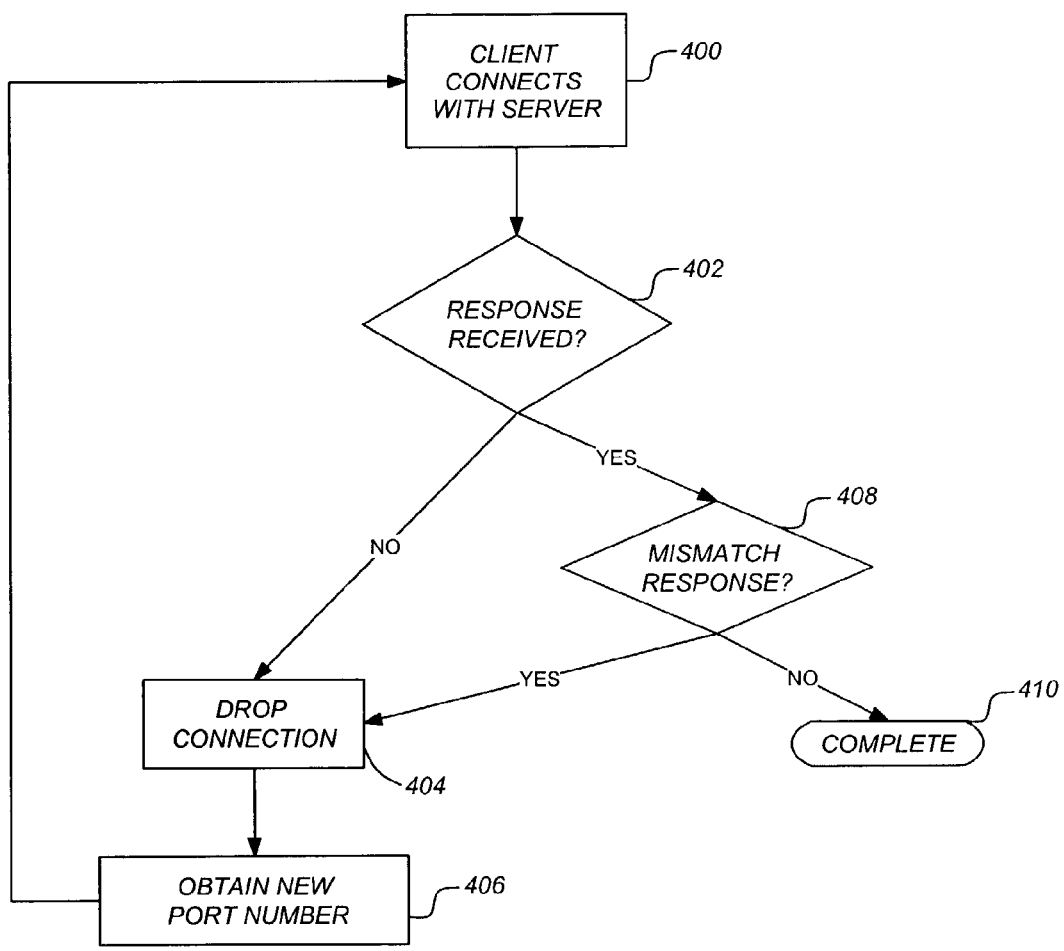
FIG. 4 is a flow chart illustrating signature identification in accordance with one or more embodiments of the invention.

FIG. 4 is a flow-chart illustrating signature identification in accordance with one or more embodiments of the invention. At step 400, after determining a port number, the client 204 connects with the server 206. At step 402, the client 204 determines if a response has been received from the server 206. If no response is received (within a specified period of time), the connection is immediately terminated at step 404 and the process continues at step 406 where a new port number is obtained as described above.

If a response has been received, the client 204 determines if the response matches the response that the client 204 expected at step 408. In other words, the client 204 determines if the signature received matches the copy of the signature the client 204 maintains. If the signatures/responses match, the correct port number has been identified, and the process is complete at step 410. However, if a mismatching response is received, the processing continues at step 404 where the connection is dropped/terminated.

Client Usage of Server Port Number

Once a connection has been established between the client 204 and the server 206, the client 204 may save the active port number and use the saved port number for all subsequent connection requests. This may seem odd and potentially misguided, but may be necessary when using PORT=AUTO. In the previous example, a server 206 was operating on derived port number 21234 instead of 11234. The discussion above demonstrated how client 204 connection requests would first bind with 11234, fail on the signature interchange, drop the connection and retry with the higher 21234 number. If the client 204 did not save the active number, then every subsequent connection to the server 206 would endure the overhead of failure on port 11234 first. Such repeated failures and processing is intolerable.

By saving the active port number on the client 204 side, all connection requests should succeed until such time as the server 206 is restarted. When the restart occurs, it is quite likely that the other application that was using port number 11234 may have since terminated. That being true, the server 206 will successfully open the first port number, and wait for connection requests. Meanwhile, all active clients 204 will attempt to bind on port number 21234 and fail. When this occurs, the client's 204 saved port number may be discarded and the bind process may be restarted from the beginning.

Client Authentication

When a client 204 initially connects with a server 206, the first thing the server 206 does is to try and identify the client 204. The server 206 utilizes the client's socket identification to solicit TCP/IP to obtain the client's 204 IP address. If the IP address cannot be determined, the inbound request is ignored and the connection is dropped. The server 206 will use the client's IP address to solicit TCP/IP to obtain the client's 204 Hostname. If the Hostname cannot be determined, the inbound request is ignored and the connection is dropped. Note that certain security controls may be relaxed such as obtaining a Hostname. Access may be granted based upon predefined IP addresses. Alternatively, an identifiable Hostname may be required. Requiring an identifiable Hostname alone may hinder access by illegal clients 204 outside the local network.

The client's 204 name/Hostname is then parsed out into Client ID and Client Domain. The client ID is considered to be the first stanza of the Hostname, and the domain is everything else. For example, Jdoe.candle.com results in a Client ID of jdoe and a Client Domain of candle.com, whereas Jdoe.nasa.secret.gov.org results in a Client Domain of nasa.secret.gov.org.

Once the Hostname is parsed into a Client ID and a Client Domain, the domain name/Client Domain is validated. If the Client Domain is not defined within a list of tolerated domains, the inbound request is ignored and the connection is dropped. Assuming the Client Domain is validated, the Client ID is then checked against a list of tolerated client names. If the Client ID is not defined in the list of tolerated clients 204, the inbound request is ignored and the connection is dropped.

There is a notable difference between failure to match on a Client Domain and a failure to match on a Client ID. A failure to match on a Client Domain is a violation from outside the immediate network 202 and may be cause for some alarm. A failure to match on Client ID may be a violation from within the immediate network 202, and may very well be benign. Violations from outside of the local network 202 receive no response, whereas violations from inside the network 202 may receive an "Access Denied" response.

Figure 5:
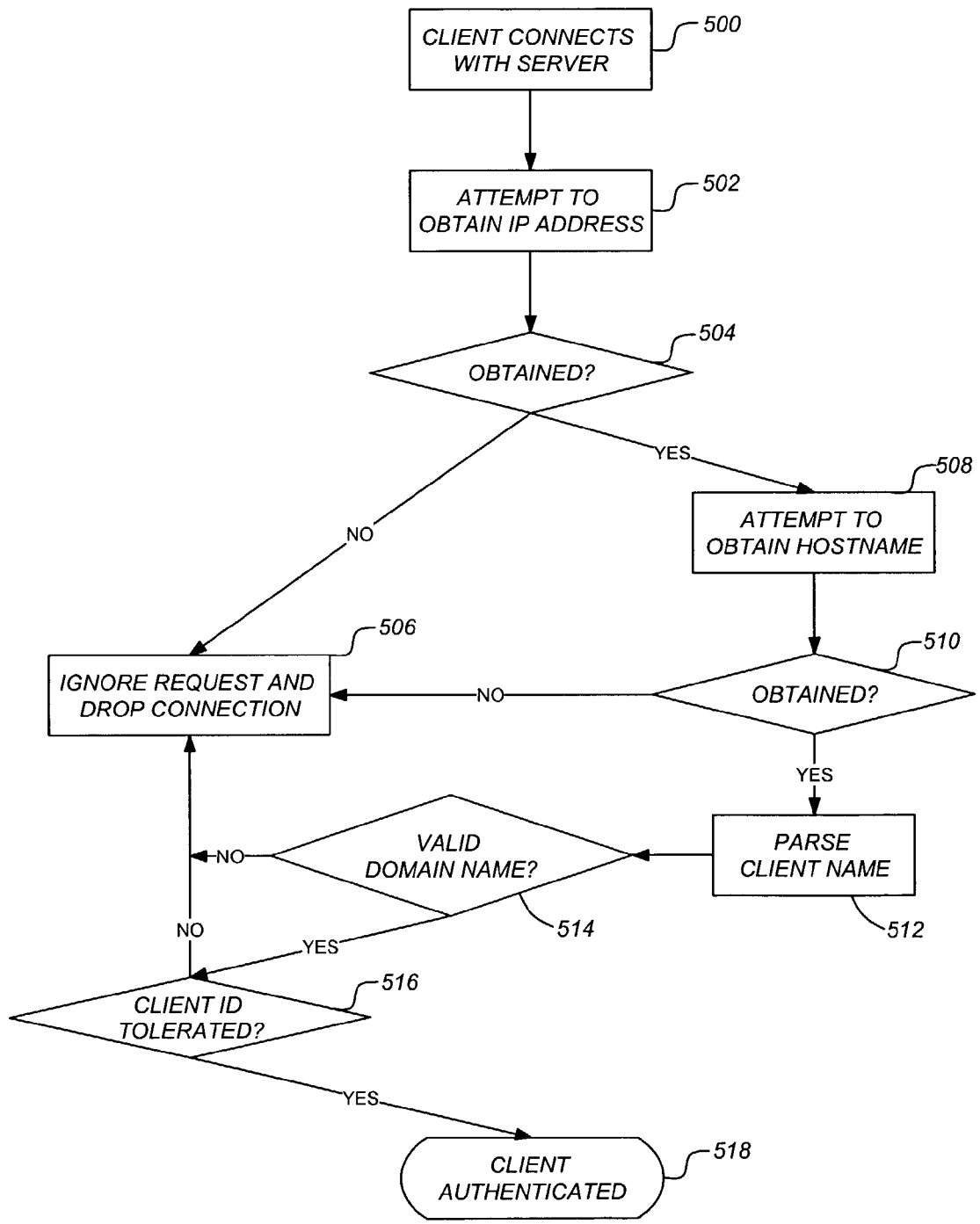
FIG. 5 is a flow chart illustrating the client authentication process in accordance with one or more embodiments of the invention.

FIG. 5 is a flow chart illustrating the client 204 authentication process in accordance with one or more embodiments of the invention. At step 500, the client 204 connects with the server 206. At step 502, the server 206 attempts to obtain the client's 204 IP address. A determination is made at step 504 if the IP address was obtained. If the IP address was not obtained, the client's 204 request is ignored and the connection is terminated at step 506. If the IP address was obtained, the server 206 attempts to obtain the Hostname at step 508. A determination is made at step 510 regarding whether the Hostname was obtained. If the Hostname was not obtained, the client 204 request is ignored and the connection is terminated at step 506.

If the Hostname was obtained, the Hostname/client name is parsed at step 512 into the Client ID and Client Domain. At step 514, the validity of the Client Domain is determined. If the Client Domain/Domain Name is invalid, the server 206 ignores the client 204 request and terminates the connection at step 506. If the Client Domain is valid, the Client ID is checked against tolerated client names at step 516. If the Client ID is not defined in the list of tolerated clients 204, the client 204 request is ignored and the connection is terminated at step 506. However, if the Client ID is tolerated, the client 204 has been authenticated and client-server communication may proceed at step 518.

Exceptions and Anomalies During Connectivity

There are instances of the client's 204 identity (i.e., the Client ID) being returned (e.g., by DHCP) to the server 206 (during authentication) without the domain name. For example, instead of the server 206 receiving the full Client Name/Host name (e.g., mcrum.Candle.com), the server 206 only receives the Client ID (e.g., mcrum). Should such a situation arise, the client 204 may be rejected based upon a domain name mismatch as described above.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of determining a port number for a network connection comprising:
    (a) determining an Internet Protocol (IP) address of a server;
    (b) determining a first number based on the IP address; and
    (c) calculating, by a computer, a second number to be used as the port number by:
        (i) adding an interval value to the first number resulting in the second number; and
        (ii) repeatedly adding the interval value until the second number is available for use as the port number.

2. The method of claim 1, wherein the first number is a four (4) digit number.

3. The method of claim 1, wherein the first number comprises a left-most digit from each stanza of the IP address.

4. The method of claim 1, further comprising determining if the second number is available for use as a port number by determining if an appropriate response is received from the server.

5. The method of claim 4, wherein the appropriate response is not received if a response is not received within a short period of time.

6. The method of claim 4, wherein the appropriate response is not received if a signature received from the server does not match a copy of the signature on a client.

7. The method of claim 1, wherein the second number has a maximum value of 65535.

8. The method of claim 1, further comprising storing the port number for use in subsequent connection requests.

9. The method of claim 1, further comprising authenticating a client by:
    validating a domain name; and
    validating the client.

10. The method of claim 9, wherein validating the domain name comprises determining if the domain name is in a list of tolerated domains.

11. The method of claim 9, wherein validating the client comprises checking a client identification against a list of tolerated client names.

12. An apparatus for determining a port number for a network connection in computer system comprising:
    (a) a computer having a memory;
    (b) on application executing on the computer, wherein the application is configured to:
        (i) determine an Internet Protocol (IP) address of a server;
        (ii) determine a first number based on the IP address; and
        (iii) calculate a second number to be used as the port number by:
            (1) adding an interval value to the first number resulting in the second number; and
            (2) repeatedly adding the interval value until the second number is available for use as the port number.

13. The apparatus of claim 12, wherein the first number is a four (4) digit number.

14. The apparatus of claim 12, wherein the first number comprises a left-most digit from each stanza of the IP address.

15. The apparatus of claim 12, wherein the application further configured to determine if the second number is available for use as a port number by determining if an appropriate response is received from the server.

16. The apparatus of claim 15, wherein the appropriate response is not received if a response is not received within a short period of time.

17. The apparatus of claim 15, wherein the appropriate response is not received if a signature received from the server does not match a copy of the signature on a client.

18. The apparatus of claim 12, wherein the second number has a maximum value of 65535.

19. The apparatus of claim 12, wherein the application is further configured to score the port number for use in subsequent connection requests.

20. The apparatus of claim 12, wherein the application is further configured to authenticate a client by:
    validating a domain name; and
    validating the client.

21. The apparatus of claim 20, wherein validating the domain name comprises determining if the domain name is in a list of tolerated domains.

22. The apparatus of claim 20, wherein validating the client comprises checking a client identification against a list of tolerated client names.

23. An article of manufacture comprising a program storage medium readable by a computer and embodying one or more instructions executable by the computer to perform a method for determining a port number for a network connection in computer system, the method comprising:
    (a) determining an Internet Protocol (IP) address of a server;
    (b) determining a first number based on the IP address; and
    (c) calculating a second number to be used as the port number by:

(i) adding an interval value to the first number resulting in the second number; and (ii) repeatedly adding the interval value until the second number is available for use as the port number.

24. The article of manufacture of claim 23, wherein the first number is a four (4) digit number.

25. The article of manufacture of claim 23, wherein the first number comprises a left-most digit from each stanza of the IP address.

26. The article of manufacture of claim 23, further comprising determining if the second number is available for use as a port number by determining if an appropriate response is received from the server.

27. The article of manufacture of claim 26, wherein the appropriate response is not received if a response is not received within a short period of time.

28. The article of manufacture of claim 26, wherein the appropriate response is not received if a signature received from the server does not match a copy of the signature on a client.

29. The article of manufacture of claim 23, wherein the second number has a maximum value of 65535.

30. The article of manufacture of claim 23, further comprising storing the port number for use in subsequent connection requests.

31. The article of manufacture of claim 23, further comprising authenticating a client by:

validating a domain name; and validating the client.

32. The article of manufacture of claim 31, wherein validating the domain name comprises determining if the domain name is in a list of tolerated domains.

33. The article of manufacture of claim 32, wherein validating the client comprises checking a client identification against a list of tolerated client names.

* * * * *